No. 832,241. PATENTED OCT. 2, 1906.
W. MacG. CRANSTON & C. C. HULING.
CONFECTIONER'S MACHINE.
APPLICATION FILED SEPT. 19, 1905.

2 SHEETS—SHEET 1.

No. 832,241. PATENTED OCT. 2, 1906.
W. MacG. CRANSTON & C. C. HULING.
CONFECTIONER'S MACHINE.
APPLICATION FILED SEPT. 19, 1905.

2 SHEETS—SHEET 2.

Witnesses: Inventors.
William MacG. Cranston
and Charles C. Huling
By Augustus B. Stoughton
Atty

UNITED STATES PATENT OFFICE.

WILLIAM MacG. CRANSTON AND CHARLES C. HULING, OF PHILADELPHIA, PENNSYLVANIA, ASSIGNORS TO V. CLAD & SONS, OF PHILADELPHIA, PENNSYLVANIA, A CORPORATION OF PENNSYLVANIA.

CONFECTIONER'S MACHINE.

No. 832,241.     Specification of Letters Patent.     Patented Oct. 2, 1906.

Application filed September 19, 1905. Serial No. 279,081.

*To all whom it may concern:*

Be it known that we, WILLIAM MacG. CRANSTON and CHARLES C. HULING, citizens of the United States, residing at the city of Philadelphia, in the county of Philadelphia and State of Pennsylvania, have jointly invented a certain new and useful Confectioner's Machine, of which the following is a specification.

Objects of the present invention are to provide for evenly and uniformly beating, working, or stirring "cream," as confectioners call a sugary preparation, as well as other articles or preparations, in such a way that the operation is facilitated and the quality of the cream improved; to improve the construction and operation of the parts of the machine which do the beating in such a way that the operation is made very thorough, even, and uniform, and can be satisfactorily performed with very little supervision on the part of the attendant, and to provide an efficient, durable, and convenient machine which can be readily cleaned.

To these and other ends hereinafter set forth the invention comprises the improvements to be presently described and finally claimed.

Figure 1:
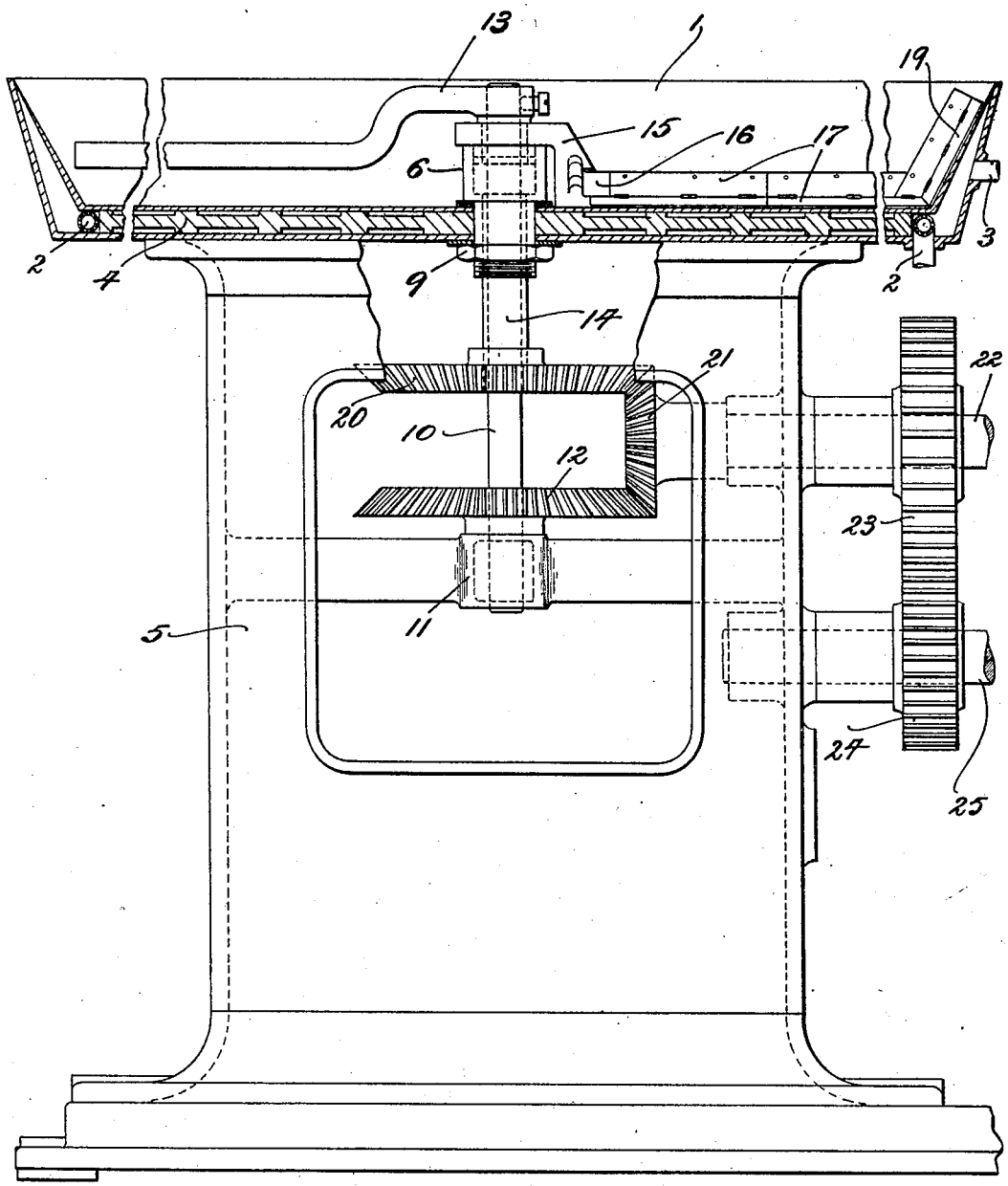
Figure 2:
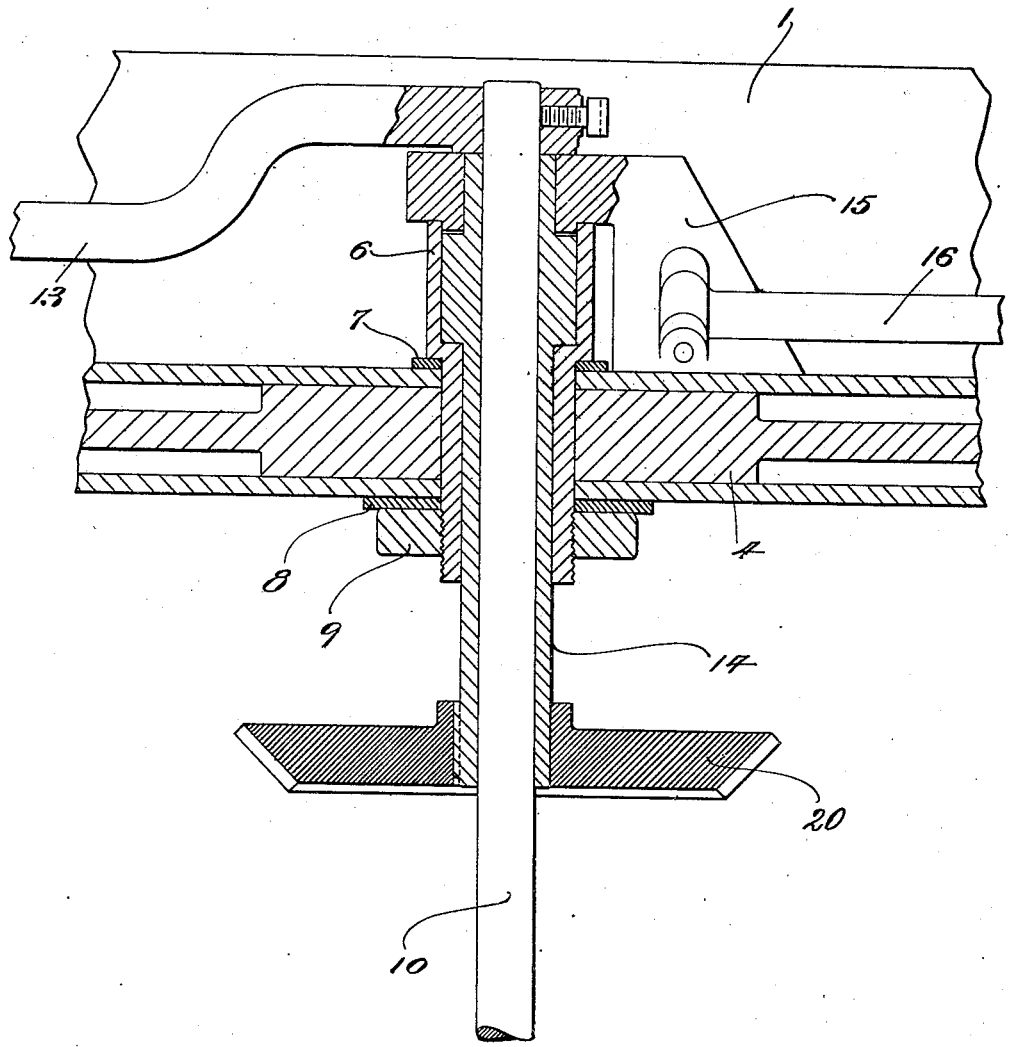

In the accompanying drawings, forming part hereof, Figure 1 is a view, partly in section and partly in elevation, illustrating a machine embodying features of the invention; and Fig. 2 is a sectional view drawn to an enlarged scale and illustrating details of construction.

In the drawings, 1 is a vessel or pan having a substantially flat bottom, which insures an even distribution of the material, as well as uniform working and heating or cooling thereof. The double walls constitute between them a jacket, to which a proper heating or cooling medium may be supplied, as by means of the pipes 2 and 3, of which the pipe 2 may be taken to be the inlet-pipe and is shown as having the portion of it within the jacket as provided with perforations. 4 is a grate or open frame interposed between the walls of the jacket, and it serves to impart the necessary rigidity and strength to them, while at the same time it affords spaces for the circulation of the heating or cooling medium. This pan or vessel 1 is supported upon a suitable housing or frame, as 5, and it serves to receive the so-called "cream" or other material which is to be worked or stirred.

6 is a tubular bushing arranged centrally of the pan or vessel and provided at one end with a flange that coöperates with a gasket or packing 7. The other end of the bushing passes through the packing or gasket 8 and is engaged by a nut 9, so that the bushing is held to place through the center of the vessel or pan in such a way that leakage of the jacket is obviated.

10 is a shaft which passes through the bushing 6 and is revolubly supported in a bearing 11, carried by the frame 5. At one end this shaft is provided with a miter gear-wheel 12 and at the other end with an arm 13, radially arranged in the pan or vessel 1 and constituting a leveler. There is a sleeve 14, which works through and is seated in an end-thrust bearing in the bushing 6. This sleeve 14 is provided with an inclined bracket 15, to which is hinged a stirring-arm 16, arranged radially in the pan and adapted to pass just beneath arm 13. To this arm 16 are hinged inclined scrapers 17, which slide along and at an inclination with the bottom of the pan or vessel. The end of the stirring-arm 16 is turned upward parallel with the curved wall of the circular pan or vessel 1, and this upturned end is provided with a hinged scraper 19, that serves to scrape material from the curved wall of the pan or vessel. The lower end of the sleeve 14 is provided with a miter gear-wheel 20.

21 is a miter gear-wheel which meshes with the similar gear-wheels 12 and 20 and serves to drive them. The power is imparted to the gear-wheel 21 through the intervention of the shaft 22 by means of spur-wheels 23 and 24, of which the latter is mounted upon the main shaft 25, to which power is applied in any convenient or appropriate manner. Obviously the stirring-arm 16 and leveler-arm 13 are turned in opposite directions, and therefore pass each other.

In use the heating-jacket may or may not be employed, and the cream or other material to be treated is placed in the pan or vessel 1 so as to cover the bottom of the same to a moderate depth, commensurate with the height of the top of the stirrer 16. The arm 16 traveling in a circle permits its scrapers to free the cream or material from the bottom or the sides of the pan, and the result of the action is one of stirring. From time to time the leveler-arm passes the stirring-arm and removes from the top of it any cream or material which may have risen into that position and returns such material to its proper position in the pan or vessel. The result of this is that the cream or other material is evenly, thoroughly, properly, and rapidly stirred and brought to the proper and desired condition or consistency for use. The hinged stirring-arm and scrapers may be turned up in order to clean the machine.

It will be obvious to those skilled in the art to which the invention relates that modifications may be made in the details of construction without departing from the spirit thereof. Hence the invention is not limited further than the state of the prior art may require; but,

Having thus described the nature and objects of the invention, what we claim as new, and desire to secure by Letters Patent, is—

1. A machine of the class specified comprising a pan or vessel, a stirring-arm arranged radially of the pan or vessel and having an upturned end, scrapers hinged to the stirring-arm and to its upturned end, a leveler-arm arranged above and concentrically with the stirring-arm, and means for turning said arms in opposite directions, substantially as described.

2. A machine of the class specified comprising a pan or vessel, a revolubly-inclined bracket arranged concentrically of the pan or vessel, a stirring-arm hinged to said bracket and provided with scrapers, a leveler-arm mounted above said stirring-arm and concentrically with the bracket and means for turning said leveler-arm and bracket in opposite directions, substantially as described.

3. A machine of the class specified, comprising the combination of a pan or vessel, a sleeve and a shaft arranged concentrically and passing through the bottom of the pan or vessel and respectively provided with oppositely-disposed miter-gears, a miter gear-wheel and its connections for driving the first-mentioned miter-gears, an inclined bracket on the sleeve, a stirring-arm pivotally connected with the bracket and provided with movable scrapers, and a leveler-arm arranged above the stirring-arm and carried by said shaft, substantially as described.

In testimony whereof we have hereunto signed our names.

WILLIAM MacG. CRANSTON.
CHARLES C. HULING.

In presence of—
K. M. GILLIGAN,
FRANK E. FRENCH.